RADIO WIRE SIGNALING SYSTEM

Filed April 18, 1947 5 Sheets-Sheet 1

ALEXANDER ELLETT
ALBERT COTSWORTH III
GILBERT E. GUSTAFSON
INVENTORS.

BY Samuel E. Darby, Jr.
THEIR ATTORNEY

ALEXANDER ELLETT
ALBERT COTSWORTH III
GILBERT E. GUSTAFSON
INVENTORS.
BY Samuel E. Darby, Jr.
THEIR ATTORNEY

RADIO WIRE SIGNALING SYSTEM

Filed April 18, 1947 5 Sheets-Sheet 3

ALEXANDER ELLETT
ALBERT COTSWORTH III
GILBERT E. GUSTAFSON
INVENTORS.

BY Samuel E. Darby, Jr.
THEIR ATTORNEY

RADIO WIRE SIGNALING SYSTEM

Filed April 18, 1947 5 Sheets-Sheet 4

ALEXANDER ELLETT
ALBERT COTSWORTH III
GILBERT E. GUSTAFSON
INVENTORS.

BY Samuel E. Darby, Jr.
THEIR ATTORNEY

RADIO WIRE SIGNALING SYSTEM

Filed April 18, 1947 5 Sheets-Sheet 5

ALEXANDER ELLETT
ALBERT COTSWORTH III
GILBERT E. GUSTAFSON
INVENTORS

BY Samuel E. Darby, Jr.
THEIR ATTORNEY

Patented May 30, 1950 2,510,046

UNITED STATES PATENT OFFICE 2,510,046

RADIO-WIRE SIGNALING SYSTEM

Alexander Ellett and Gilbert E. Gustafson, River Forest, and Albert Cotsworth, III, Oak Park, Ill., assignors to Zenith Radio Corporation, a corporation of Illinois Application April 18, 1947, Serial No. 742,374

18 Claims. (Cl. 178—5.6)

This invention relates to broad band intelligence transmission systems and more particularly to such systems for the radio broadcast of broad frequency band intelligence for toll or hire.

It is physically possible to transmit wide band intelligence, such for example as television signals, or many simultaneous narrower band signals, through wave guides or coaxial transmission lines for long distances. It is, however, usually desired, as for example with television signals, to transmit such intelligence simultaneously to many members of the public, as in broadcast television, in which case the use of wave guides or coaxial transmission lines is far too expensive to be practical.

When such intelligence is transmitted by radio broadcast to make it available simultaneously to many members of the public, the cost of operation of such a system is far larger than the cost of operation of a sound broadcast system, and in fact appears to be much too large to be paid for by the sale of advertising time. Even some sound broadcasting is not economically feasible. A solution to the economic problem involved appears to be to require a fee from each member of the public who receives such a signal. If such a signal, as for example a television program, to be transmitted by radio broadcast, it would be possible to charge a fee for operation of the system by imposing a governmental tax on the use of the receivers. Such an arrangement has been used in certain places where the broadcast transmitters are controlled by the Government, but has the serious disadvantage that lack of competition in presenting the programs seriously impairs entertainment quality, and such a tax is not proportionate to the use of the service.

It is therefore an object of this invention to provide a new system for the radio broadcast of intelligence, such as television or radio programs, wherein only receivers for which the appropriate fee has been paid for the amount of service desired can reconvert the broadcast intelligence into useable form, while retaining the advantages of competetive transmission of such programs.

It is a corollary object of the invention to provide such a system especially suited for transmission of wide frequency band intelligence.

It is a more specific object to provide such a radio broadcast system which makes use of presently existing economic units for the manufacture of the necessary transmitters and receivers, for the origination and dissemination of the programs, and for the collection of the necessary fees for receipt of such programs.

It is a still more specific object of this invention to provide a system for transmission of intelligence requiring wide frequency bands in which the wide frequency bands are transmitted by radiation but at the same time are useless to one who receives them unless he subscribes to a service for receiving additional necessary intelligence.

The features of the present invention which are believed to be novel are set forth with particularity in the appended claims. The present invention itself, both as to its organization and manner of operation, together with further objects and advantages thereof may best be understood by reference to the following description taken in connection with accompanying drawings in which:

Figures 5, 6 and 7 are circuit diagrams of certain portions of the embodiment shown in Figure 4.

Figure 1:
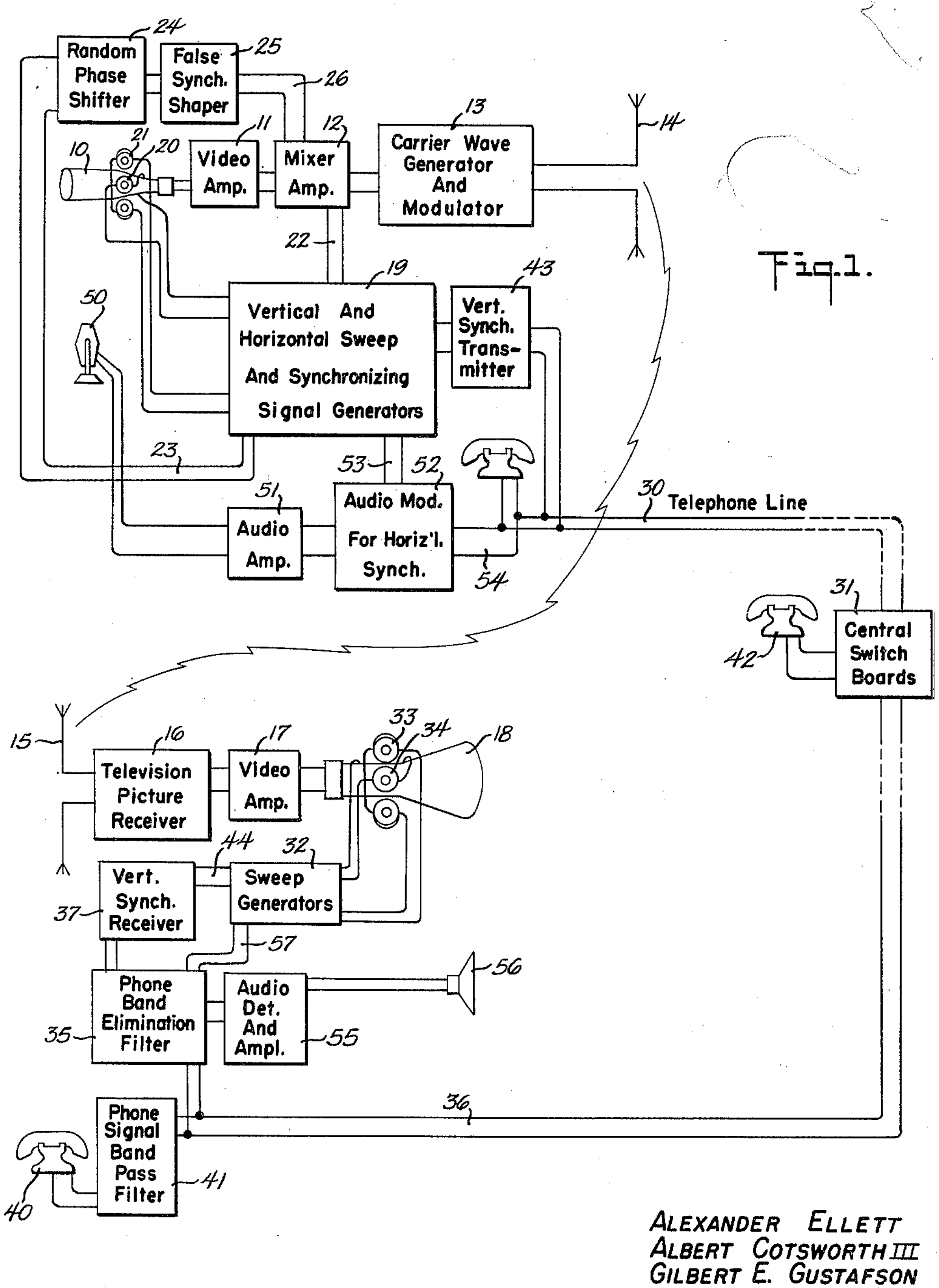
Figure 1 illustrates a system embodying one particular form of the invention.

In Figure 1 an iconoscope, image orthicon, or other suitable picture converting device 10 is arranged to convert a visual image into appropriately scanned currents of varying frequency and amplitude, which currents are amplified through a video amplifier 11, mixed with blanking pedestals and false synchronizing signals in a mixer amplifier 12, and caused to modulate a carrier wave in a carrier wave generator and modulator 13, the carrier wave being radiated from a suitable antenna arrangement 14.

The carrier wave radiated from the antenna 14 are received on a receiving antenna 15, and are tuned, amplified, and detected in a television picture receiver 16, the reproduced picture currents being amplified in a video amplifier 17 and reproduced on a kinescope 18 which is suitably supplied with the proper scanning voltages.

In the transmitter, suitable vertical and horizontal sweep or scanning voltages and the corresponding correct synchronizing signals are produced in a vertical and horizontal sweep and synchronizing signal generators 19 from which the vertical and horizontal deflecting coils 20 and 21 are supplied with suitable scanning currents, these coils 20 and 21 being associated with the picture tube 10 in order to cause it to scan lines of the visual image in proper sequence and speed to produce picture currents as desired.

The generator 19, as is usual, also produces horizontal blanking pedestals which are transmitted through suitable conductors 22 to the mixer amplifier 12 in which the blanking pedestals are injected into the video current as regularly recurrent pulses such as those on which synchronizing signals normally are imposed.

The generator 19 also produces a sine wave corresponding in period to the horizontal synchronizing pulses, and this sine wave is transmitted through suitable conductors 23 and through a random phase shifter 24 to a false synchronizing signal shaper 25, whose output pulses are exactly like horizontal synchronizing signals except that they are timed incorrectly at random. These synchronizing signals from the false synchronizing signal shaper 25 are transferred through suitable conductors 26 to the mixer amplifier 12 where they are superimposed on the blanking pedestals which interrupt the video current, with the consequence that any ordinary receiver for such signals which intercepts the carrier wave from the antenna or radiator 14 responds falsely to the false horizontal synchronizing signals and therefore fails properly to reproduce pictures.

While the horizontal blanking pedestals are transmitted to the mixing amplifier 12 through conductors 22 from generator 19, neither vertical blanking pedestals nor vertical synchronizing signals are so transmitted and the radiated waves from antenna 14 contain only the video signals from video amplifier 11 mixed with horizontal blanking pedestals and false synchronizing signals in the mixer amplifier 12. The resulting signal, lacking any vertical synchronizing signals and containing only false horizontal synchronizing signals could be reproduced only with extreme difficulty.

Proper horizontal and vertical synchronizing signals are transmitted from the generators 19 in the transmitter through a telephone line 30 to central switchboards 31. The receiver illustrated contains sweep generators 32 connected with suitable horizontal sweep coils 33 and vertical sweep coils 34. The sweep generators 32 include a horizontal sweep generator which is connected through a phone band elimination filter 35 to a telephone line 36 which in turn is connected with the central switchboards 31. The phone band elimination filter 35 is also arranged to receive vertical synchronizing signals from the telephone line 36, and to transmit them through a vertical synchronizing signal reeciver 37 to the sweep generators 32 in which the vertical synchronizing signals cause properly timed operation of the vertical sweep generator. A telephone 40 near the television receiver illustrated is connected through a phone signal bandpass filter 41 to the telephone line 36 in order that it may be connected to any other telephone 42 through the central switchboards 31 for normal telephone conversations.

In the transmitter the vertical synchronizing signal transmitter 43 is arranged to produce a carrier wave outside of the telephone signal band and to impress that carrier wave onto the telephone line 30. The vertical synchronizing signal transmitter 43 is connected to the vertical synchronizing signal generator 19 and arranged so that the vertical synchronizing signal modulates the carrier produced by the transmitter 43 either in amplitude or in frequency as may be found convenient.

In the receiver the vertical synchronizing receiver 37 is connected through the phone band elimination filter 35 to the telephone line 36 and is arranged to receive the carrier from the transmitter 43 and to demodulate it so as to reproduce the vertical synchronizing signal which is then transmitted through suitable conductors 44 to the sweep generators 32 in order that the vertical sweep generator shall be synchronized with the vertical synchronizing signals.

In the transmitter a sound pickup microphone 50 is also provided to translate the sound associated with an image received by the picture tube 10 into a varying electric current, and this electric current representing sound is amplified by the audio modulator 51 and impressed on an audio amplifier for horizontal synchronizing signals 52. This audio modulator 52 is connected through suitable conductors 53 with the horizontal synchronizing signal generator 19 and produces a sine wave carrier current from the horizontal synchronizing signals, the amplitude or frequency of which current is modulated by the audio signals from amplifier 51. The resultant modulated sine wave horizontal synchronizing signals are supplied by the audio modulator 52 through suitable connections 54 to the telephone line 30 through which they are transferred along with the carrier waves modulated by vertical synchronizing signals from transmitter 43 to the central switchboards 31.

In the receiver these audio modulated sine wave horizontal synchronizing signals are transferred through the phone band elimination filter 35 to an audio detector and amplifier 55, which demodulates the sine wave horizontal synchronizing signal and reproduces the sound which is then impressed on the speaker 56 placed in proximity to the kinescope 18 so that associated sound and pictures are reproduced simultaneously.

The sine wave horizontal synchronizing signals are also transferred from the phone band elimination filters through suitable conductors 57 to the sweep generators 32 in which they are used to cause proper synchronization of the horizontal sweep generator so as to energize the horizontal sweep coils 33 in proper phase and time relation with the horizontal sweep coil 21 in the transmitter.

In the operation of the entire system, a television receiver can only with extreme difficulty be made to reproduce pictures properly from signals radiated from the antenna 14 without receiving the corresponding synchronizing signals over the telephone line. When pictures are desired, a call is made to the central switchboards 31 where appropriate connections are made between the telephone line 30 and the telephone line 36 so that proper synchronizing signals and the accompanying sounds are transferred through the telephone line from the transmitter to the receiver in order that the receiver may properly reproduce picture signals received from the antenna 14. A suitable charge may be made by the operator at the central switchboard 31 for such connections in the same manner as is now the practice with long distance telephone calls.

In summary, signals radiated from the antenna 14 contain picture currents, horizontal blanking pedestals, and false synchronizing signals superimposed on the horizontal blanking pedestals but contain no vertical synchronizing signals or pedestals at all. Horizontal synchronizing signals, in the form of sine waves, together with sound signals which are modulated on the sine wave horizontal synchronizing signal and vertical synchronizing signals modulated on another carrier, are sent over the telephone lines 30 and 36 to the receiver where they are recombined with the picture currents received from the antenna 14 and caused to form a complete picture and the accompanying sound.

While the system as described is arranged so that vertical synchronizing signals are sent as modulations of a carrier wave from the vertical synchronizing signal transmitter 43, it is within the scope of the invention to transmit such vertical synchronizing signals as a sine wave whose period is equal to that of the vertical synchronizing signal itself. In any case, the sine wave horizontal synchronizing signals, together with the side band produced by audio modulation and the sine wave vertical synchronizing signals or alternatively the carrier modulated by vertical synchronizing signals are made to lie outside of the telephone signal band, which is commonly regarded as containing frequencies between 200 and 2500 cycles. For example, the sine wave horizontal synchronizing signal could be 15,750 cycles per second, modulated with sound from microphone 50 extending over a band of frequencies from 100 to 5000 cycles per second, while the vertical synchronizing signal could be a sine wave of about 60 cycles a second or a carrier wave of about 5000 cycles per second, modulated by the vertical synchronizing signal. In any case the phone signal band pass filter 41 is arranged to pass only frequencies within the range to be reproduced by the telephone 40 and to prevent the passage of the sine wave horizontal synchronizing signal and its wide band complements as well as the vertical synchronizing signal and the carrier on which it is modulated, if any.

Because the television synchronizing signals and television sound are transmitted over the telephone wire in frequency bands which are not coincident with the bands passed by the filter 41, the telephone 40 may be used in normal fashion whether the television receiver is in operation or not.

It is also within the scope of the invention to transmit over the telephone line 30 and through the central switchboards 31 to individual receivers any part of the signals described as being transmitted over the telephone line, as for example, the sine wave horizontal synchronizing signal alone, or modulated with television sounds, or the vertical synchronizing signal alone. It is the essence of the invention that the complete television signal at the transmitter comprising video and synchronizing signals and the accompanying sound, be produced in two parts, of which one part occupies a wide frequency band suitable for radio broadcast transmission but difficult to use for the reproduction of the complete television signal without the other part which occupies a relatively narrow frequency band suitable for transmission over the telephone line. It is also within the scope of the invention to modulate the sine wave horizontal synchronizing signal on the phone line with the television sound so that only the lower or upper side band is transmitted, and it is preferred to transmit only the lower side band product of such modulation in order to make best use of the frequency response characteristics of telephone lines usually encountered.

In the present day television system where video signals, synchronizing signals, and accompanying sound are all transmitted by radiation from an antenna, much trouble is commonly encountered at the receiver because of the reception of static, ignition noise and other extraneous voltages. The present system is of great advantage in that synchronizing signals transmitted over the telephone line arrive at the receiver with relatively very small disturbance by extraneous voltages so that the receiver synchronizing is much more effective than present day systems, and therefore a much better picture is reproduced. It is therefore preferred to transmit over the telephone line both horizontal and vertical synchronizing signals.

In order to render it difficult or impossible to reproduce the picture at the receiver, it is necessary that both parts of the wide band signal be produced at the transmitter in order that the part of the signal which is transmitted over the telephone line may not be easily reproduced at the receiver by some means not connected with the telephone line. For example, it is not sufficient for the purposes of this invention merely to use 60 cycle current from power mains at the transmitter as one part of the signal since, even though that 60 cycle current be transmitted over the telephone line to the receiver, it could as easily at the receiver be derived from 60 cycle power mains at the receiver without the necessity of taking it from the telephone line. It is necessary to produce at the transmitter a complete television signal of which that part to be transmitted over the telephone line is unique so that only those who have paid the required fee by reason of connection at a central switchboard shall be able to receive that unique signal and properly reproduce the picture and sound at the receiver.

In order to aid in the confustion of the unauthorized reception of a signal by one who has not made connection through the central switchboard 31, the random phase shifter 24 and the false synchronizing signal shaper 25 are arranged to superimpose on the horizontal pedestals in the transmitted and broadcast television signal, a false synchronizing signal whose time phase is not correct for reproduction of the picture at the receiver. For this purpose the random phase shifter 24 is constructed so that it is keyed in with horizontal synchronizing signals from the generator 19, but is arranged alternately to shift the horizontal synchronizing signals back and forth preferably within the range of the horizontal pedestals, in an entirely random manner. For this purpose the random phase shifter 24 may be constructed as illustrated in Figure 2.

Figure 2:
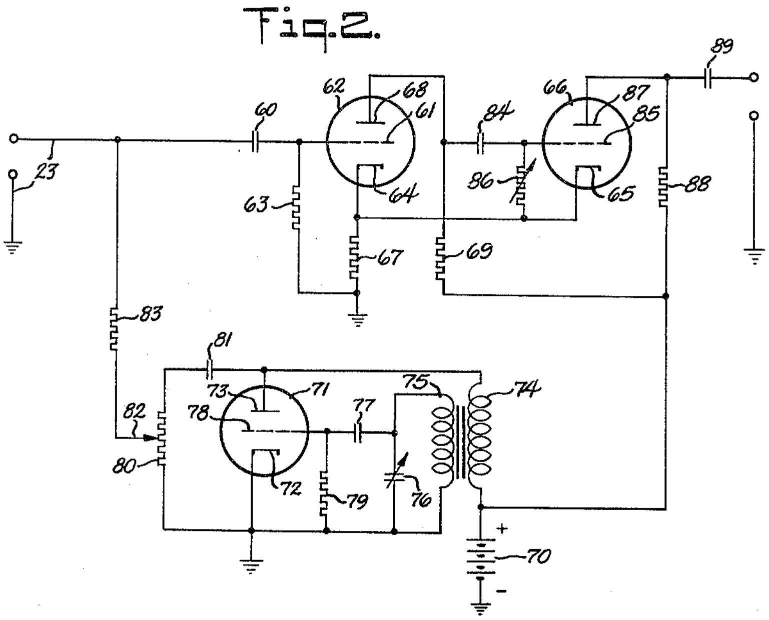
Figure 2 is a detailed circuit diagram of a portion of the system illustrated in Figure 1.

In Figure 2 one of conductors 23 is grounded, that same conductor, of course, being grounded in generator 19, and the other conductor connected through a blocking condenser 60 to the grid 61 of an electron discharge device 62, which acts as a mixing amplifier. The grid 61 of device 62 is connected through a suitable grid resistance 63 to ground, and the cathode 64 of the device 62 is connected directly to the cathode 65 of a second electron discharge device 66, both cathodes being connected through a resistance 67 to ground. The anode 68 of the device 62 is connected through a suitable load resistance 69 to the positive terminal of a source 70 of operating current, the negative terminal of which source is grounded.

In addition to the horizontal synchronizing signal impressed on the grid 61 of device 62, a much lower frequency sine wave is also impressed on that grid from an oscillator which includes another electron discharge device 71 whose cathode 72 is grounded. The anode 73 in the device 71 is connected through the primary 74 of an iron core transformer to the positive terminal of the source 70, the secondary 75 of the transformer being connected in shunt with a variable condenser 76 to form a circuit resonant at the frequency of the low frequency waves desired to be mixed on grid 61 with the horizontal synchronizing signals. One terminal of the secondary 75 is grounded, thereby being connected to cathode 72, and the other terminal is connected trough a coupling condenser 77 to the grid 78 of the device 71, the grid 78 being connected through a grid leak resistance 79 to the grounded cathode 72 of the device 71. So constructed, the device 71 with the tuned circuit 75, 76 produces oscillations at a low frequency determined by the adjustment of the condenser 76.

In order to impress the generated oscillations from device 71 on grid 61, one terminal of a voltage dividing resistance 80 is connected to the grounded cathode 72 and the other terminal through a blocking condenser 81 to the anode 73 of the device 71. The movable tap 82 of the voltage dividing resistance 80 is connected through a decoupling resistance 83 to the ungrounded one of conductors 23, thereby being connected through condenser 60 to the grid 61 so that oscillations in an amount determined by the adjustment of the tap 82 on resistance 80 are applied to grid 61 of device 62.

While the device 62 has been termed a mixing amplifier, it acutally operates together with device 66 and its associated circuit elements as a trigger circuit which produces pulses in the output of the device 66 whenever the sum of the two waves impressed on grid 61 is increasing and passes an average voltage point. To form this trigger circuit, the anode 68 of device 62 is connected through a coupling condenser 84 to the grid 85 of the device 66 and the grid 85 is connected through an adjustable grid resistance 86 to the cathode 65. The anode 87 of device 66 is connected to a suitable load resistance 88 to the positive terminal of source 70.

In operation, since the resistance 86 is connected directly between grid 85 and cathode 65 of device 66, there is no bias on grid 85 of device 66 and that device normally tends to conduct. So long as device 66 is conducting, current flowing through resistance 67 is large enough to maintain cathode 64 of device 62 positive with respect to grid 61 in sufficient amount to cut off current flow in device 62. When voltage is applied between conductors 23 with a polarity tending to make grid 61 more positive, if that voltage is sufficient, current begins to flow in device 62, the potential of anode 68 decreases thereby simultaneously reducing the potential of grid 85 which reduces current flow through device 66 and resistance 67. Upon the reduction of current flow through resistance 67 the potential of cathode 64 decreases thereby making grid 61 in effect even less negative with respect to cathode 64 so that still more current flows through device 62 and the anode 68 decreases still further in potential. This process continues until device 62 is conducting enough current to make grid 85 of device 66 negative with respect to cathode 65 a sufficient amount to cut off current flow in device 66.

During this operation, and following the cut-off of current flow in device 66, condenser 84 is charged through resistance 86 so that, after an interval determined by the time constant of condenser 84 and resistance 86, the grid 85 becomes less negative and current flow is no longer cut off through the device 66. Consequent initiation of the current through device 66 reverses the entire operation and ultimately causes current cut-off in device 62 so that device 66 remains conductive and device 62 without current flow until another positive pulse is impressed on grid 61. For the purposes of this invention the time constant of condenser 84 and resistance 86 is made quite short compared to the time duration of one cycle of the horizontal sine wave synchronizing signal between conductors 23, so that the output voltage of the device 66 appearing across resistance 88 takes the form of a short, flat topped and steep sided pulse. This short pulse is impressed upon the false synchronizing signal shaper 25 by the condutcors illustrated of which one is grounded and the other connected through a condenser 89 to anode 87.

If the oscillator including discharge device 71 were not in operation or if tap 82 were moved to the grounded end of the voltage dividing resistance 80, only the sine wave horizontal synchronizing signal from conductors 23 would be impressed on grid 61, and such a pulse would be produced across resistance 88 exactly in time with the sine wave horizontal synchronizing signal and with uniform spacing. Such a pulse, superimposed upon the horizontal blanking pedestals, could be used as a proper horizontal synchronizing signal. For the purpose of shifting this pulse back and forth in time in a random manner, a suitable amount of the output voltage of the oscillator including device 71 is impressed on grid 61 in addition to the sine wave horizontal synchronizing signal by adjusting tap 82 upwardly on the voltage dividing resistance 80. In the presence of the output voltage of the oscillator including device 71 and the sine wave horizontal synchronizing signal, pulses are produced across resistance 88 having a variable time relation with respect to the period of the sine wave horizontal synchronizing signal. As will be described in detail in the following paragraphs, these pulses shift back and forth in time so that they may occur either coincidentally with the intersection of the sine wave horizontal synchronizing signal with its A.-C. axis, may precede such intersection, or follow such intersection.

Figure 3:
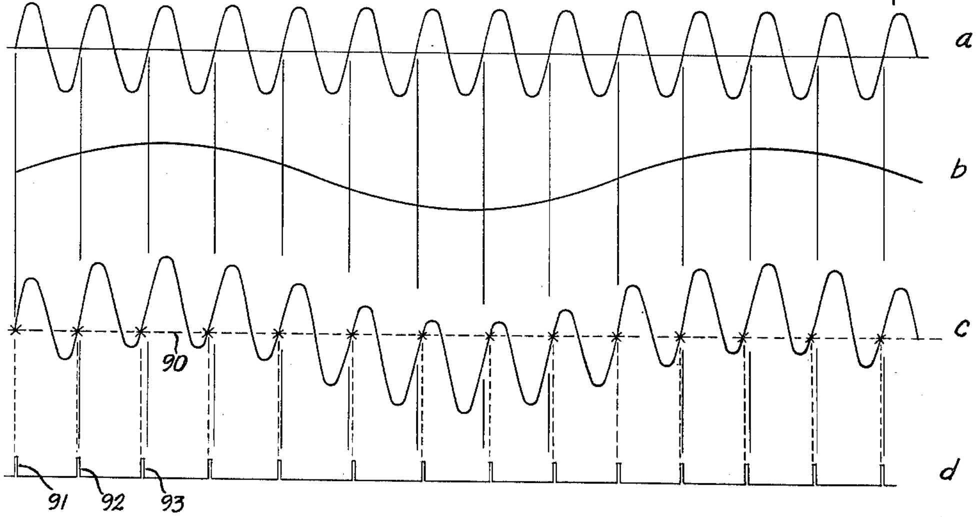
Figure 3 illustrates certain characteristics of the circuit arrangement shown in Figure 2.

This operation of shifting the timing of the false synchronizing pulses appearing across resistance 88 with respect to the sine wave horizontal synchronizing signal is better understood by reference to Figure 3. In Figure 3 the curve labeled *a* is representative of a sine wave horizontal synchronizing signal such as is transferred from the generator 19 through the conductors 23 to grid 61. In that same figure, the curve labeled *b* is representative of the low frequence sine wave which may be generated by the oscillator including device 71. The curve labeled *c* is a composite voltage such as appears on grid 61 in the presence of both of the voltages represented by the curves *a* and *b*. The straight horizontal line 90 drawn through the curve labeled *c* represents the voltage bias point for grid 61 at which trigger action of the device 62 is commenced at any time when a wave crosses the line 90 going upwards.

The pulsed curve laveled *d* in Figure 3 represents the output voltage appearing across resistance 88 when a voltage wave of the shape represented by the curve labeled c is impressed on grid 61. The first pulse 91 of the curve d has a leading edge which coincides with the time when the curve c crosses line 90 in the positive direction. The trailing edge of pulse 91 follows a short time later, the time being determined by the time constant of condenser 84 and resistance 86. The second pulse 92 of the curve d has a leading edge which coincides, as shown by the vertical dotted line, with the second point where curve c crosses line 90 in the positive direction, and it should be noted that this leading edge of pulse 92 precedes in time by a small amount the second upward crossing of the center line by curve a, as shown by the vertical solid line. In other words, the leading edges of the pulses 91 and 92 of curve d are closer together in time than one period of the curve a. This crowding of the pulses 91 and 92 corresponds to a positively increasing voltage of the low frequency curve b.

The third pulse 93 of the curve d has a leading edge which again corresponds with the third point where curve c crosses line 90 in the positive direction, as shown by the vertical dotted line, and this pulse 93 precedes by a still greater amount, as shown by the vertical solid line, the third upward crossing over the center line of curve a.

The following pulses of curve d increase in spacing as the low frequency sine wave of curve b tends in the negative direction and begin again to crowd together as th e low frequency sine wave of curve b turns upward in the positive direction.

The frequency of the wave represented by curve b, generated by the oscillator including device 71, can be adjusted entirely arbitrarily so that it bears no integral relation whatever with the horizontal synchronizing signal period, and its amplitude may be adjusted so that the change in spacing of the pulses represented by curve d does not place those pulses outside the horizontal blanking pedestal. In such case, the change in timing of the false horizontal synchronizing signals would, in a normal receiver, tend to make any picture which could be reproduced quite unrecognizable, and this effect is substantially greater if the voltage wave generated by the oscillator including device 71 is made to depart somewhat from a sine wave and is made to have some relation with respect to the horizontal synchronizing signal which does not repeat for a long period.

It is in fact entirely within the scope of the invention to use a purely random oscillation generator of any kind to alter at random the tripping of the trigger circuit including devices 62 and 66.

There are in general several ways in which the complete television signal may be separated at the transmitter so that the wide band portion is reproduceable at a receiver only with difficulty in the absence of the other portion. It is a relaively simple matter, for example, to separate a complete television signal into picture and synchronizing signal current for one part, and into the accompanying sound for the other part, which is to be transmitted over the telephone line in a way which does not interfere with ordinary telephone conversation.

An alternative method of separating the complete television signal into parts is to operate upon the video current or upon the synchronizing signals at the transmitter in such fashion that they must be used at the receiver differently from normal video synchronizing signals and to transmit over the telephone line the information when the switch is made to and from that abnormal condition. In that case, even though the receiver be arranged so that it can receive television signals under either such normal or abnormal conditions, it is impossible to determine at the receiver the proper time when the switch back and forth should be made. As an example of such a system, in the normal system video current representing black portions of the picture produce maximum carrier amplitude (below the synchronizing signals) and white portions of the picture produce minimum carrier amplitude. For abnormal operation, the position can be reversed so that white portions of the picture produce video current which modulates the carrier in such a way as to produce maximum carrier amplitude while black portions of the picture produce minimum carrier amplitude, in which case reception of such a signal with an ordinary television receiver built by accepted standards in this country would reproduce a picture which looks like a negative photograph. To switch back and forth rapidly from normal operation to such abnormal operation, causes the picture to assume a fairly uniform intermediate grey cast.

Figure 4:
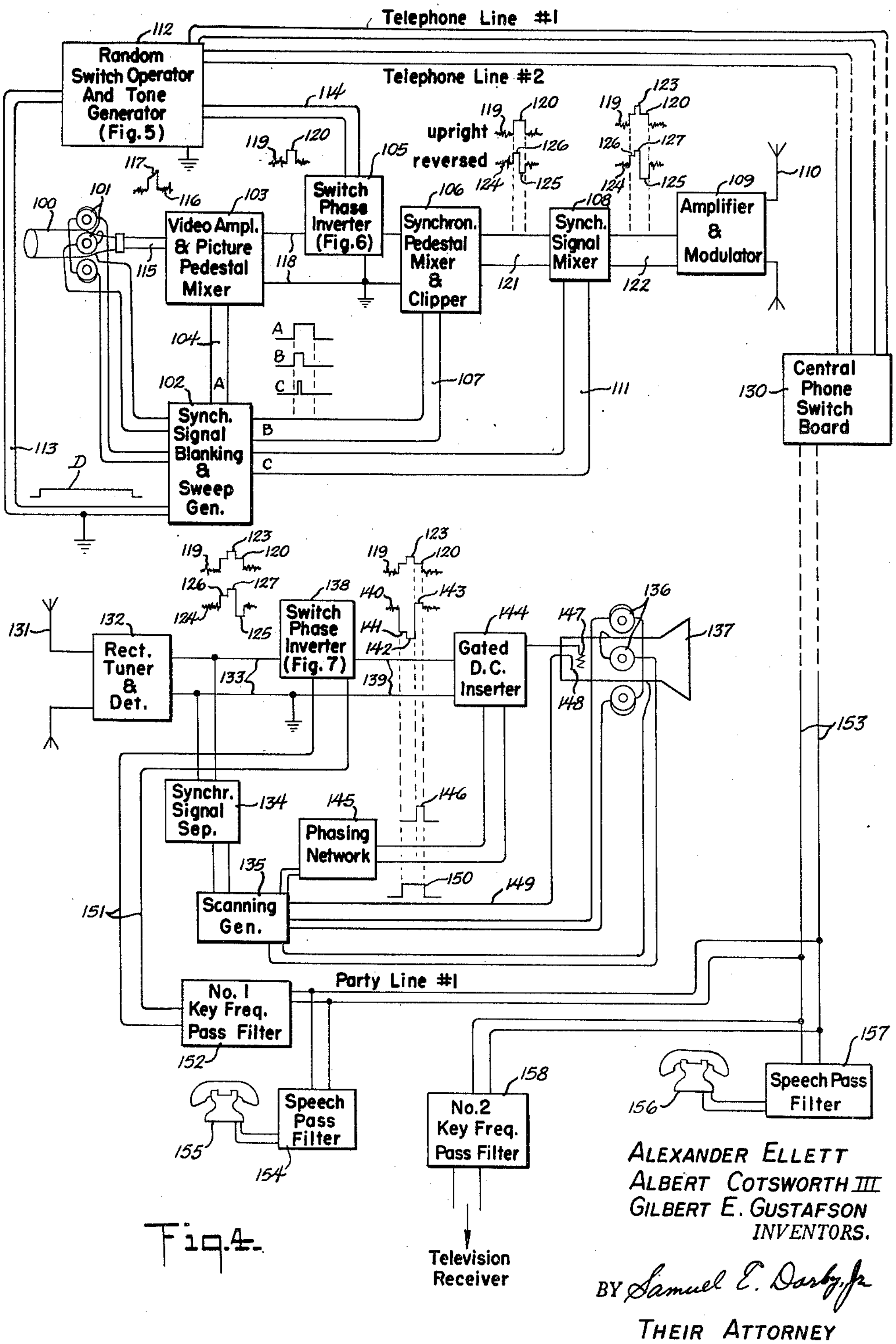
Figure 4 illustrates another system embodying a different form of the invention.

In Figure 4, a complete television system including a transmitter and a receiver both connected appropriately with telephone lines is illustrated for carrying out in practice such an arrangement in which the black and white portions of the picture are alternately and successively transposed at a random rate, the random rate being indicated at the receiver only through the telephone lines. An iconoscope 100, scanned appropriately by scanning coils 101, fed from a synchronizing signal, blanking and sweep generator 102, produces video currents which are amplified and mixed with appropriate picture pedestals in a video amplifier and picture pedestal mixer 103. The picture pedestals are appropriately generated in the blanking generator 102 which is connected to the video amplifier and mixer 103 by suitable connections 104, in which the wave form of the voltage appears as represented at A. Amplified vido signals mixed with picture pedestals from amplifier and mixer 103, are then transferred through a switch phase inverter 105 to a synchronizing pedestal mixer and clipper 106 into which synchronizing pedestals are fed through conductors 107 from the generator 102 as illustrated by the wave form marked B. These synchronizing pedestals have a leading edge coinciding with pedestals A but are substantially shorter in time duration. Signals from the mixer and clipper 106, are then transferred through a synchronizing signal mixer 108 to an amplifier and modulator 109 where the high frequency carrier wave is modulated by the composite video signals, pedestals and synchronizing signals and is radiated from antenna 110. The synchronizing signal mixer 108 is connected through conductors 111 with the generator 102 which generates and impresses on the conductors 111 a pulse wave form as illustrated by curve C which represents horizontal synchronizing pulses. It should be noted also that the leading edge of the horizontal synchronizing pulse C follows the leading edges of the pedestals A and B and that the trailing edge of the pulse C coincides with the trailing edge of the pedestal B. Vertical equalizing, blanking and synchronizing signals, are generated in normal fashion by the synchronizing signal, blanking and sweep generator 102, and are mixed with the composite signal in normal fashion in the synchronizing signal mixer 108.

A random switch operator and tone generator 112 is connected through suitable conductors 113 to the synchronizing signal, blanking and sweep generator 102 from which it is keyed by the vertical synchronizing signals gate pulse of the usual form as illustrated by the curve D just above conductors 113. The random switch operator 112 acts at random, but only when initiated by a vertical gate pulse coming through conductors 113, to impress operating voltage through conductors 114 on the switch phase inverter 105 to cause it to reverse the phase of video signals being transferred between video amplifier and mixer 103, and mixer and clipper 106. That is, when the random switch operator 112 operates in one direction, the inverter 105 operates to invert the video signals, and when the random switch operator operates in the other direction, video signals pass through the switch phase inverter 105 without phase inversion.

When signals pass through the phase inverter 105 without phase inversion, the system operates to produce a normal composite television signal as may be understood by reference to the small wave form indicated just above the corresponding conductors. Conductors 115 connecting the iconoscope 100 with the video amplifier and mixer 103 transmit a wave including video current component 116 and a blanking pulse 117 which is usually not flat topped nor of good shape. After the video currents have been amplified and mixed with the picture pedestals A in the amplifier and mixer 103 the composite signal appears in conductors 118 with the video current component 119 and a clean square picture pedestal 120. When the phase inverter 105 is not inverting the phase of the video current, the composite signal appears in conductors 121 connecting the mixer and clipper 106 and the mixer 108 as represented by the curve marked "upright" of similar shape to the curve containing the video component 119 and picture pedestal 120. After passage of that signal through the mixer 108 the resulting current in conductors 122 still appears with video components 119, picture pedestal 120 and a synchronizing signal 123, like the pulse C in conductors 111, superimposed on the picture pedestal 120. This composite signal 119, 120, 123, then modulates the high frequency carrier wave and is radiated.

When the phase inverter 105 is operating to invert the phase of the composite signal in conductors 118, the output of the mixer and clipper 106 is substantially different in form, as it appears in conductors 121. Video currents 124 are reversed in phase, and the picture pedestal 125 is also reversed in phase, but the leading portion of it, represented by the upward square pulse 126, as appears in the curve marked "reverse" extends upward rather than downward because of the injection in the mixer and clipper 106 of the voltage pulse as illustrated in curve B. After this composite signal 124, 125, 126, is transferred through the mixer 108, the video current 124 of reverse phase and the picture pedestal 125, also of reverse phase, together with the pulse 126 appear, but with the addition on top of the pulse 126 of a synchronizing pulse 127 like that illustrated by curve C.

The use of these two different wave forms is highly desirable in the "upright" and "reversed" operation in order that the picture background may be reinserted in the transmitter just before the modulator stage as is usual, and also may be reinserted in the receiver just before the signal is impressed on the kinescope. This reinsertion is accomplished when the signal is upright by setting the upper level of the picture pedestal 120 at a fixed voltage, rather than by setting the upward tip of the synchronizing pulse 123 at a fixed voltage as is frequently done, and is also accomplished when the picture is reversed by setting the downwardly extending pulse 125 at a fixed voltage, in both cases the background reinsertion being accomplished from a flat topped pulse at the black level. That is, when the picture is upright the black level is up, and when the picture is reversed the black level is down so that the pulse 120 represents black in the upright position, and the pulse 125 represents black in the reverse position.

The random switch operator and tone generator 112, which causes phase reversal to take place in the switch phase inverter 105 at random, also generates two tone signals of different frequency which are respectively transmitted over the telephone lines marked Nos. 1 and 2, respectively, at times when the picture is reversed but not when the picture is upright. These two telephone lines marked Nos. 1 and 2 extend to a central phone switchboard 130, from which board these tone frequencies may be connected to any other desired telephone line, as requested, a charge being made for such connection. The two telephone lines marked Nos. 1 and 2 are utilized with two different tone frequencies from the generator 112 for party line service. That is, if only one receiver on one branch of a party line requests connection for television reception, the central switchboard 130 switches to that party phone line only that one of the two tone frequencies which corresponds to that party's particular party line, the other party line connected on the same main telephone line being arranged with a filter so that that particular tone frequency cannot pass to the television receiver connected with the other party's telephone.

It is to be understood that it is within the scope of this invention to generate a single tone at the transmitter which will be distributed to all of the central phone switchboards and used there to key separate tone oscillators to supply appropriate key signals for any one of a number of party line users.

The television receiver associated with such a transmitter receives signals radiated from the antenna 110 through an antenna 131, and tunes, amplifies and detects such signals in normal fashion in a tuner and detector 132. The detected signal which appears in the output of the detector 132 is identical in form with that in conductors 122 of the transmitter and the two curves just above conductors 133 are numbered similarly to the curves above the conductors 122 in the transmitter to indicate that identity. The detected signals in conductors 133 are impressed on a synchronizing signal separator 134, which is constructed in normal fashion, and the synchronizing signals in the output of the separator 134 are impressed on the scanning generator 135 of usual construction, which is connected with scanning coils 136 associated with kinescope 137 to cause proper scanning.

The detected signals in conductors 133, which are illustrated in the curves above those conductors, are alternately "upright" and "reverse." They are transferred through a switch phase inverter 138 which is keyed to operate together with the switch phase inverter 105 in the transmitter, so that its output in conductors 139 appears like one of the curves above those conductors. The upper curve, representing the "upright" condition is the same as the "upright" curve above conductors 133, as indicated by the numerals. The lower curve above conductors 139 is reversed in phase, so that its video component 140 represents black in the upper direction and white in the lower direction, just as do the video currents 119 of the "upright" curve. The picture pedestal 141 extends downward and the synchronizing signal 142 extends still further downward below the picture pedestal 141 while the pulse 143 extends upward to the black level.

The composite signals either "upright" or "reverse" in conductors 139 are impressed on a gated D. C. inserter 144 which operates in normal fashion for background insertion except that it is switched entirely off for background insertion except during the time when the pulse 143 in the "reverse" wave is present or during the time when that part of the picture pedestal 120 in the "upright" wave following the synchronizing pulse 123 is present. For gating this D. C. inserter 144 appropriate connection is made through a phasing network 145 to the scanning generator 135 which produces a pulse represented by a curve 146, the vertical dotted lines illustrating that the time duration of the pulse 146 coincides with the upright pulse 143 in the "reverse" wave and with the part of the pedestal 120 in the "upright" wave following the synchronizing pulse 123.

The output signal of the gated D. C. inserter 144 is impressed on the grid 147 of kinescope 137 so that the illustrated composite signals are impressed on that grid, and so that the average bias on the grid is controlled by the inserter 144, which, however, adjusts that average bias only during the existence of pulse 146. In order that the picture pedestal 141 and the synchronizing signal 142 in the "reverse" wave shall not cause retrace lines in the kinescope 137 to be white rather than black, as desired, the cathode 148 of kinescope 137 is connected through a suitable conductor 149 to the scanning generator 135 which produces a blanking pulse as illustrated by curve 150. This blanking pulse 150, as shown by the vertical dotted lines, extends from the leading edges of the picture pedestals 120 or 141 and continues to the trailing edges of the picture pedestal 120 or the pulse 143, and its amplitude is sufficient to cut off electron current in the kinescope 137 during the time it is present.

The phasing network 145 is connected between the scanning generator 135 and the gated D. C. inserter 144, in order that the time of occurrence of the leading and trailing edges of pulse 146 may be adjusted exactly as illustrated.

In order that the switch phase inverter 138 of the receiver may be operated in proper synchronism with the switch phase inverter 105 in the transmitter, it is connected through conductors 151 and through a pass band filter labeled "No. 1 key frequency pass filter" 152 to a telephone line labeled "Party line No. 1" which in turn is connected to a main telephone line 153 extending to the central switchboard 130. Also connected to the party line No. 1 through a speech pass filter 154 is a telephone set 155, the frequency pass bands of the filters 152 and 154 being arranged so that they do not overlap whereby the telephone 155 may be used in normal fashion regardless of the connection of the television receiver to the telephone line 153. The band pass filter 152 is tuned so that it is responsive only to the tone frequency generated by the generator 112 and impressed on the telephone line No. 1 at the transmitter, so it is impossible without alteration of the filter 152 for the illustrated television receiver to be operated in response to the tone frequency generated at the transmitter by the generator 112, and impressed on telephone line No. 2, since that tone frequency is substantially different and is not passed by the filter 152.

On the same main party line 153 it is quite usual that one or more telephones are connected in addition to the telephone set 155. As illustrated, a second telephone set 156 is connected to a speech pass filter 157, similar to the filter 154, to the telephone line 153, and the user of the telephone set 156 may also have a television receiver like that illustrated in detail associated with the telephone set 155 provided he connects said receiver as illustrated through a filter 158 labeled "No. 2 key frequency pass filter" to the telephone line 153. The filter 158 is arranged so that it passes only the tone frequency generated by the generator 112 in the transmitter and impressed on telephone line No. 2, whereby the television receiver associated with the telephone set 156 cannot respond, without disturbing the filter 158, to the tone frequency impressed on telephone line No. 1 of the transmitter and intended for use by party line No. 1.

By the provision of two or more such tone frequencies, an operator at the central switchboard 130 may energize the party line 153 with either or both of these tone frequencies, and may make appropriate charges to be paid as required, so that either or both of the corresponding television receivers associated with the line 153 may be used.

Figures 5, 6:
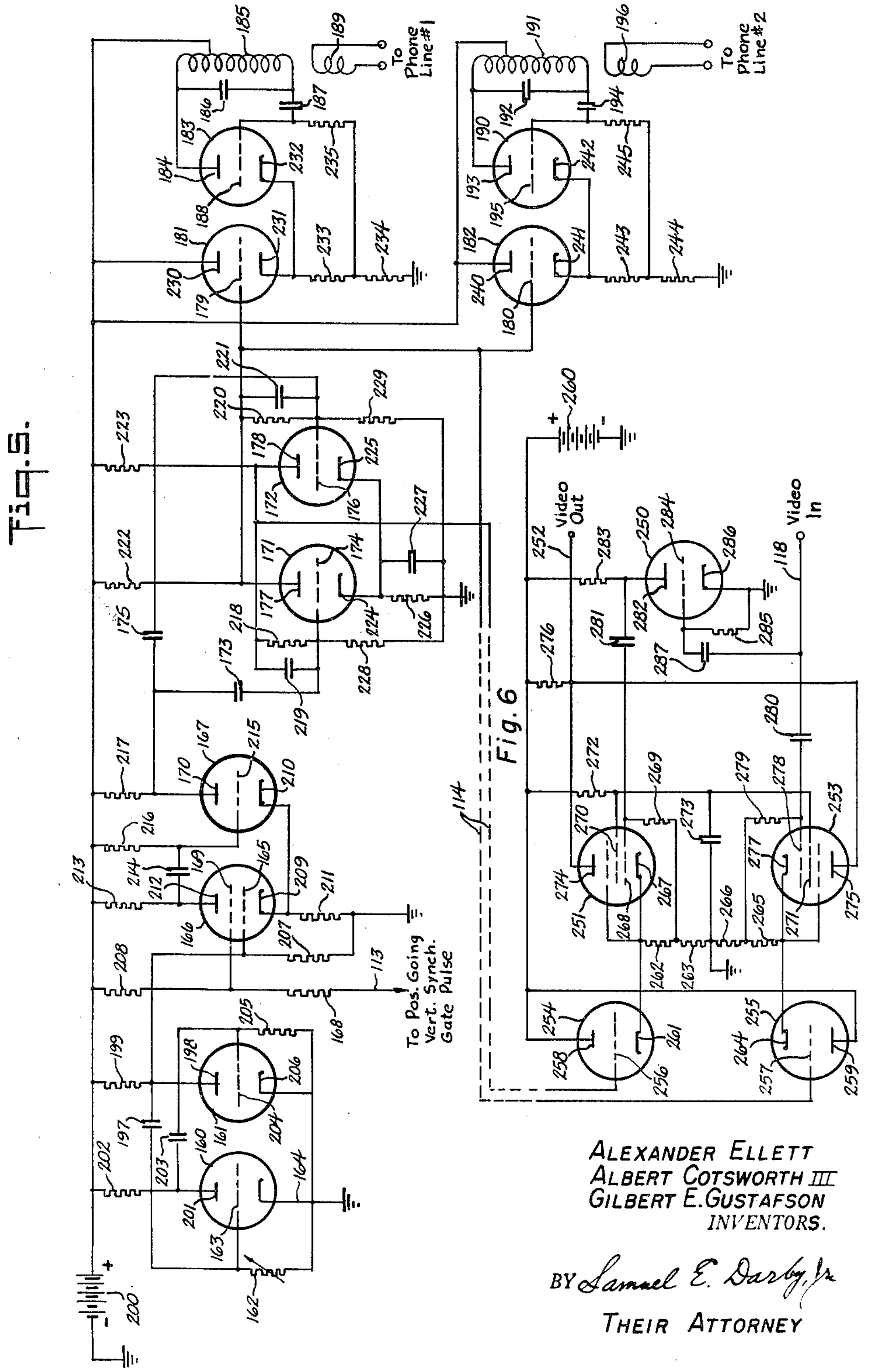
Figure 2:
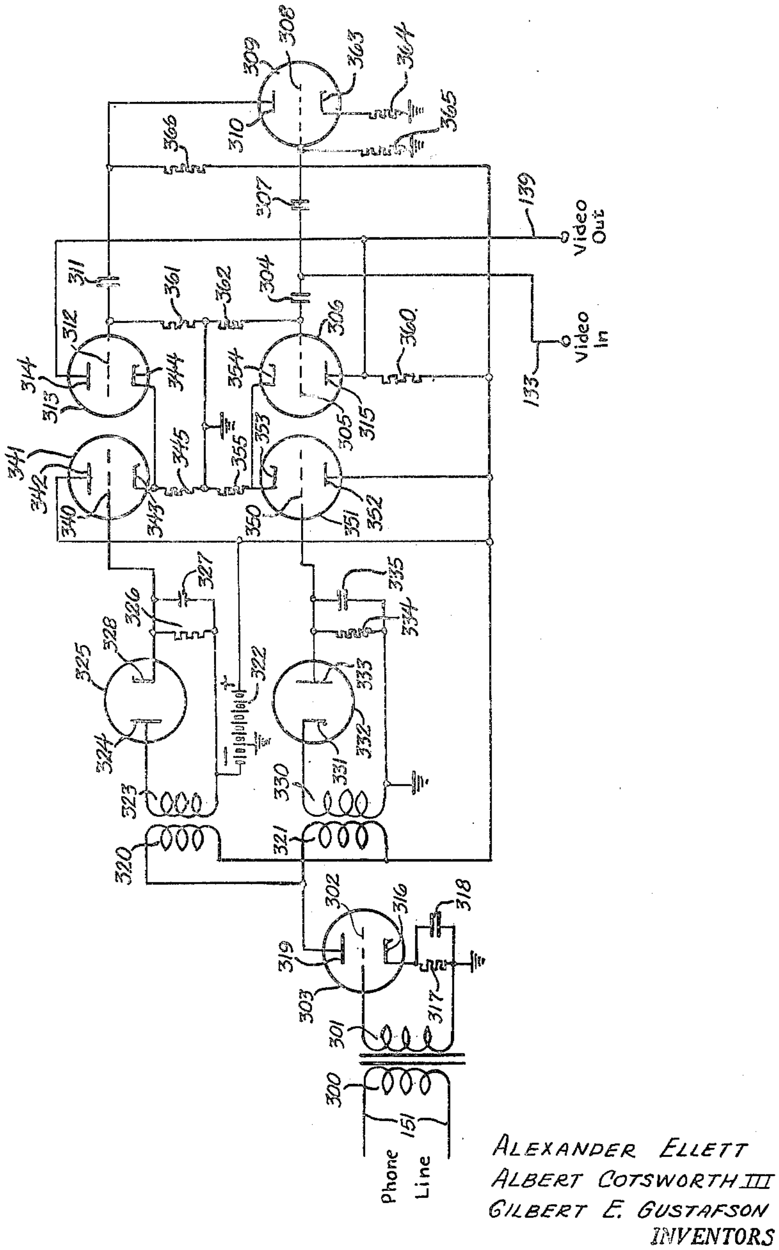

In the description of Figure 4 most of the parts illustrated are of conventional nature with the exception of the random switch operator and tone generator 112, which is illustrated in Figure 5 and described in connection therewith, the switch phase inverter 105, which is illustrated in Figure 6 and described in connection therewith, and the switch phase inverter 138, which is illustrated in Figure 7 and described in connection therewith. In Figure 5 the random switch operator and tone generator 112 (Figure 4) includes a multivibrator which has two electron discharge devices 160 and 161 arranged to produce uniformly recurring pulses at a variable rate determined by adjustment of a resistance 162 connected between the grid 163 and grounded cathode 164 of device 160. The rate of recurrence of these uniformly recurring pulses is adjusted so that it bears no integral relation except over a long period of time with the positive going vertical synchronizing gate pulses transmitted to the random switch operator 112 from the synchronizing signal, blanking and sweep generator 102 through conductors 113. These uniformly recurring pulses produced by the multivibrator are impressed on the first control electrode 165 of a discharge device 166, which is appropriately connected with a second discharge device 167 to operate as a triggering circuit, similar to the triggering circuit illustrated in Figure 2 which includes discharge devices 62 and 66. The positive going vertical synchronizing gate pulses from conductors 113, one of which is grounded and the other of which is shown in Fig. 5, are impressed through a resistance 168 on the second control electrode 169 of discharge device 166, the triggering circuit including discharge devices 166 and 167 being arranged so that, only upon the coincidence of a positive going vertical synchronizing gate pulse and a positive going pulse from the multivibrator including discharge devices 160 and 161 is a triggering operation instituted with the result that the anode 170 of the device 167 produces a pulse in the positive direction.

In response to the appearance of such a positive pulse on the anode 170 of the device 167 in the triggering circuit, an electron switch is operated to reverse its previous condition. This electron switch includes discharge devices 171 and 172 so that either one remains normally conductive, while the other is cut off, until the appearance of a positive pulse from the anode 170 of the device 167 of the triggering circuit. Positive pulses on the anode 170 are impressed through a condenser 173 on the grid 174 of device 171, and are also impressed through a second condenser 175 on the grid 176 of device 172. When a positive pulse appears on the grid of that one of the devices 171 and 172 which is conducting, such pulse produces no result on that grid, when such pulse appears on the grid of the non-conductive device it causes that device to become conductive when such pulse appears, and this in turn causes the formerly conductive device to become non-conductive and remain in that condition until the appearance of a succeeding positive pulse on the anode 170. Consequently, upon one coincidence of a positive going vertical synchronizing gate pulse on the conductors 113 with a positive pulse from the multivibrator including devices 160 and 161, the anode 177 of the device 171 moves in a positive direction and remains there while the anode 178 of device 172 moves in a negative direction and stays there. Subsequently, upon the next coincidence of a positive going vertical synchronizing gate pulse on the conductors 113 with a positive pulse produced by the multivibrator including devices 160 and 161, the anode 177 of device 171 moves in a negative direction and stays there, while the anode 178 of the device 172 moves in a positive direction and remains there until the next action of the trigger circuit including devices 166 and 167. The switch including devices 171 and 172 therefor, operates at random times but only during the existence of a positive going, vertical synchronizing gate pulse, so that any operations performed in the transmitter illustrated in Figure 4 are performed during the vertical retrace of a transmitted picture. It is preferred to cause switching from one position to another of the picture during this vertical retrace interval, since that is the longest interval in which no picture is being reproduced and thus very high speed switching is not required. It is entirely within the scope of the invention to effect such switching during the horizontal retrace interval. This is not preferred, however, as difficulties may be encountered in providing sufficiently high speed switching so that the entire operation is accomplished in the horizontal retrace interval and does not extend into the horizontal forward trace interval. Any such extension of the switching operation may introduce undesirable bright or dark spots on the resulting picture.

The two conductors 114 which extend from the random switch operator 112 in Figure 4, to the switch phase inverter 105 are connected respectively to the anode 177 of device 171 and to the anode 178 of the device 172 in the switch.

The anode 177 of device 171 is also connected directly to the control electrodes 179 and 180 of electron discharge devices 181 and 182, each of which is arranged as a keying device for a respective tone frequency oscillator. The keying devices are arranged so as to prevent operation of the tone frequency oscillators at all times when the anode 177 of device 171 is positive and to allow operation of such oscillators only when the anode 177 has a minimum positive potential. The tone frequency oscillator associated with device 181 includes an electron discharge device 183, the anode 184 of which is connected to one terminal of a tuned circuit including an inductance 185 connected in shunt with a condenser 186, the other termial of the tuned circuit being connected to a condenser 187 to the control electrode 188 of the discharge device 183. The resonant frequency of the tuned circuit 185, 186 is adjusted to the desired tone frequency which, when it is being produced, indicates through phone line #1, across which is connected an inductance coil 189 magnetically coupled with the coil 185, that the anode 177 is resting at its least positive or most negative voltage. A similar tone frequency oscillator, including a discharge device 190, is associated with the keying device 182 to produce a different tone frequency. A resonant circuit including an inductance coil 191 connected in shunt with a condenser 192 is connected at one terminal with the anode 193 of device 190 and at the other terminal to a condenser 194 connected to the control electrode 195 of device 190. The resonant frequency of circuit 191, 192 is equal to the different tone frequency desired. The phone line No. 2 is connected across an inductance coil 196 coupled to the coil 191.

The circuit arrangements of these various components of the random switch operator and tone generators are briefly as follows: The control electrode 163 of the device 160 in the random rate multivibrator is connected through a condenser 197 to the anode 198 of device 161, the anode 198 being connected through a suitable load resistance 199 to the positive terminal of a source 200 of operating potential, the negative terminal of which source is grounded. The anode 198 of device 161 is also connected directly to the control electrode 165 of the device 166 in the triggering circuit. The anode 201 of device 160 is connected through a suitable load resistance 202 to the positive terminal of source 200. The anode 201 is also connected through a condenser 203 to the control electrode 204 of device 161, a grid resistance 205 being connected between the control electrode 204 and the grounded cathode 206 of device 161. The various circuit elements of the multivibrator are, of course, adjusted to suitable magnitudes so that the desired range of variation of the rate of produced pulses may be adjusted by adjustment of resistance 162.

In the triggering circuit, the first control electrode 165 of device 166 is connected through a suitable grid resistance 207 to ground and the second control electrode 169 of the device 166 which is connected through the decoupling resistance 168 to the ungrounded one of conductors 113, is also connected to a suitable resistance 208 to the positive terminal of source 200. The cathode 209 of device 166 is connected directly with the cathode 210 of device 167, and both of those cathodes are connected through a resistance 211 to ground. The anode 212 of device 166 is connected through a suitable load resistance 213 to the positive terminal of source 200 and is also connected through a coupling condenser 214 to the control electrode 215 of device 167. The control electrode 215 is also connected through a relatively large grid resistance 216 to the positive terminal of source 200 so as to insure that, when the control electrodes 165 and 169 of device 166 are unexcited by positive going pulses of sufficient magnitude, the device 167 will remain conductive. The anode 170 of device 167 is connected to a suitable load resistance 217 to the positive terminal of source 200, and as described previously, is coupled through condensers 173 and 175, respectively, to the control electrodes 174 and 176 of the discharge devices 171 and 172 in the switch.

The control electrode 174 of device 171 in the switch is connected through a parallel combination of a resistance 218, and the condenser 219 to the anode 178 of device 172, and similarly, the control electrode 176 of the device 172 is connected to a parallel combination of a resistance 220 and condenser 221 to the anode 177 of the device 171. The anode 177 of device 171 is also connected through a load resistance 222 to the positive terminal of source 200 and the anode 178 of device 172 is connected through a load resistance 223 to the positive terminal of source 200. Cathodes 224 and 225 of devices 171 and 172 are connected together and in common through a parallel combination of resistance 226 and the condenser 227 to ground. Grid 174 of device 171 is connected through a suitable grid resistance 228 to ground, and the grid 176 of device 172 is connected through a separate grid resistance 229 to ground. So arranged with the circuit elements properly adjusted in magnitude, so long as device 171 is conductive, device 172 is non-conductive, and remains that way with anode 178 at its most positive potential and anode 177 at its most negative potential, and alternately, so long as device 171 is non-conductive, device 172 stays conductive with the anode 178 at its most negative potential and the anode 177 at its most positive potential.

In the keying device including the discharge device 181, the anode 230 is connected directly to the positive terminal of source 200 while the cathode 231 is connected directly with the cathode 232 of the oscillator device 183, both cathodes being connected to ground through the serially arranged resistances 233 and 234. The control electrode 188 of the oscillator device 183 is connected through a grid resistance 235 to a point between resistances 233 and 234. With such connections, and the resistances 233 and 234 properly proportioned, when the control electrode 179 is most positive, the cathode 231 is also highly positive and maintains cathode 232 highly positive with the result that the device 183 cannot oscillate since current through it is cut off. When the control electrode 179 of the keying device 181 is less positive during the time when anode 177 of the switch device 171 is least positive, the cathode 231 of the keying device 181 is reduced to a sufficiently small positive potential that the oscillator device 183 can develop a suitable operating bias between its control electrode 188 and the cathode 232 for operation as an oscillator so as to develop the desired tone frequency and couple it into the inductance 189 connected to phone line No. 1.

In similar fashion, the keying device 182 is arranged to start and stop oscillation of the device 190 simultaneously with the starting and stopping of the oscillator device 183. The anode 240 of device 182 is connected directly to the positive terminal of source 200 and the cathode 241 of device 182 is connected directly with the cathode 242 of device 190 both cathodes being connected to ground through two serially arranged resistances 243 and 244. The control electrode 195 of the oscillator device 190 is connected through a grid resistance 245 to a point between the resistances 243 and 244. The operation of the keying device 182 of the oscillator device 190 is similar to that of the keying device 181 and the oscillator device 183 except that the tone frequency produced is different and is coupled into the inductance 186 for transmission through phone line No. 2.

In Figure 6 the circuit details of the switch phase inverter 105 (Figure 4) are illustrated, the arrangement being connected through the dotted conductors 114 with the circuit arrangement of Figure 5. Video signals 119, 120 (Figure 4) on conductors 118, one of which is grounded, are alternately transmitted in "upright" position through a triode amplifier discharge device 250 and a second amplifier discharge device 251 to an output terminal 252, or in "reverse condition" through a phase inverting amplifying discharge device 253 to the output teminal 252. The output terminal 252 is unnumbered in Figure 4, but extends from the switch phase inverter 105 to the synchronizing pedestal mixer and clipper 106. The amplifying devices 251 and 253 are alternately rendered incapable of amplifying by means of their respective switching devices 254 and 255, the control electrodes 256 and 257 of which are directly connected to conductors 114. The control electrode 256 of device 254 is connected to that one of the conductors 114 which extends to anode 178 of the device 172 and the control electrode 257 of the device 255 is connected to the other of the conductors 114 which extends to the anode 177 of device 171.

In brief, the anode 258 of device 254 is connected directly with the anode 259 of the device 255 and directly with the positive terminal of a source 260 of operating current, the negative terminal of which is grounded. Cathode 261 of device 254 is connected serially through two resistances 262 and 263 to ground, and the cathode 264 of device 255 is connected serially through two resistances 265 and 266 to ground. The cathode 267 of the device 251 is connected directly to cathode 261 of the discharge device 254, and the first control electrode 268 of device 251 is connected through a suitable grid resistance 269 to a point between resistances 262 and 263. The screen electrode 270 of device 251 is connected directly with the screen electrode 271 of device 253, and both are connected through a resistance 272 to the positive terminal of source 260, and are also connected through a by-passing condenser 273 to ground. The anode 274 of device 251 is connected directly with the anode 275 of device 253, and both are connected directly with the terminal 252, and through a suitable load resistance 276 to the positive terminal of source 260.

The cathode 277 of device 253 is connected directly with the cathode 264 of device 255, and the first control electrode 278 of device 253 is connected through a grid resistance 279 to a point between resistances 265 and 266. The control electrode 278 of device 253 is also coupled through a suitable condenser 280 to the ungrounded one of conductors 118 labeled in Figure 6 "video in." onsequently, when the anode 177 of device 171 in the switch of Figure 5 is least positive, the grid 257 of device 255 tends to cut off current flow through the device 255 and reduces the bias across resistance 265 sufficiently that the inverter amplifier device 253 may operate to amplify and invert in phase signals impressed on the control electrode 278 from the conductor 118 so that they appear at the output terminal 252 in amplified form and in inverted phase.

The control electrode 268 of the "upright" amplifier 251 is connected through a coupling condenser 281 with the anode 282 of device 250, the anode 282 being connected through a suitable load resistance 283 to the positive terminal of source 260. The control electrode 284 of device 250 is connected through a suitable grid resistance 285 to the grounded cathode 286 thereof and is also connected through a coupling condenser 287 to the ungrounded conductor 118 labeled "video in." Consequently, when the anode 178 of the switch in Figure 5 is least positive, current flow through the device 254 tends to be cut off and reduces the voltage across resistance 262 sufficiently that the "upright" amplifier 251 may operate, the inverter amplifier 253 being at the same time rendered inoperative by large current flow through the device 255. Under such conditions, video signals 119, 120, appearing on conductor 118 are amplified through device 250 and impressed on the control electrode 268 of the device 251 in which they are again amplified and impressed on terminal 252 labeled "video out."

The gain or amplification of the device 253 is adjusted to be equal to the combined gain or amplification of the devices 250 and 251, in order that signals transferred between conductor 118 and terminal 252 are unchanged in amplitude at the time the phase is reversed.

In Figure 7 the circuit details of the switch phase inverter 138 in the receiver of Figure 4 are briefly as follows: The two conductors 151 are terminated in a transformer primary 300, the secondary 301 of which is connected between ground and the control electrode 302 of an electron discharge amplifying device 303, which operates to amplify tone frequency signals received from the telephone line over conductors 151. Of the two conductors 133 illustrated in Figure 4, one is grounded and the other labeled "video in" in Figure 7 is connected through a coupling condenser 304 to control electrode 305 of a video amplifier discharge device 306. This one of the conductors 133 is also connected through a condenser 307 to a control electrode 308 of a video amplifier device 309, the anode 310 of which is connected through a coupling condenser 311 to the control electrode 312 of a video amplifier discharge device 313, whose anode 314 is connected directly to the anode 315 of device 306, both anodes being connected directly to the ungrounded conductor 139, labeled in Figure 7 "video out" and shown in Figure 4 as connected between the switch inverter 138 and the gated D. C. inserter 144. The circuit is so arranged that when no tone frequency is received over the telephone line 151, video signals from the conductor 133 are amplified successively through devices 309 and 313 and impressed on the conductor 139 labeled "video out." When the tone frequency appears on the conductors 151, the discharge device 313 is cut off and the discharge device 306 is made operative so that signals from the conductor 133 are amplified through device 306 and impressed on conductor 139 in inverted phase. The specific circuit connections for achieving this result are briefly as follows:

The cathode 316 of device 303 is connected to a parallel combination of biasing resistance 317 and by-passing condenser 318 to ground and the anode 319 is connected to the parallel combination of transformer primaries 320 and 321 to the positive terminal of a source 322 of operating potential, an intermediate point of which is grounded. Consequently, when tone frequencies appear on the conductors 151 they are amplified through device 303 and appear both on the transformer primary 320 and the transformer primary 321.

A transformer secondary 323 is magnetically coupled with the primary 320 and one terminal of the secondary 323 is connected to the anode 324 of a rectifying discharge device 325 the cathode 328 of which is connected through a parallel combination of resistance 326 and by-passing condenser 327 to the other terminal of the secondary 323, and also to the negative terminal of source 322, so that when the device 325 is not rectifying its cathode 328 is maintained at a substantial negative potential with respect to ground.

A transformer secondary 330 is magnetically coupled with transformer primary 321, one terminal being grounded and the other terminal being connected to the cathode 331 of a rectifying discharge device 332, the anode 333 of which is connected to ground through the parallel combination of a resistance 334 and a condenser 335.

When a tone frequency signal appears on the conductors 151, both rectifiers 325 and 332 develop rectified potentials respectively across the resistances 326 and 334 in such a direction that the anode 333 becomes negative with respect to ground and the cathode 328 becomes less negative with respect to ground, or even positive with respect to ground. When there are no tone frequency signals present in the conductors 151, the opposite conditions prevail, the anode 333 going substantially to ground potential and the cathode 328 being maintained substantially negative with respect to ground.

These alternatively positive and negative potentials with respect to ground, which respectively appear when there is or is not a tone frequency signal present in the conductors 151, are utilized to render the discharge devices 306 and 313 alternately operative. For this purpose, the cathode 328 of rectifier device 325 is directly connected to the control electrode 340 of a discharge device 341 whose anode 342 is directly connected to the positive terminal of source 322 and whose cathode 343 is connected to the cathode 344 of video amplifier device 313, both cathodes being connected to ground through a resistance 345. When the cathode 328 and the control electrode 340 are near ground potential, the device 341 is conductive, and maintains cathode 343 at a substantial positive potential so that device 313 is cut off and cannot amplify. This condition is present when a tone frequency signal appears on the conductors 151. When there is no tone frequency signal on conductors 151, cathode 328 and control electrode 340 of rectifier 325 and amplifier device 341, respectively, are maintained at a substantial negative potential so that there is little or no current flow through the device 341 with the result that cathode 344 of the video amplifier device 313 drops in potential sufficiently that the device 313 amplifies.

In the other branch of the inverter switch, anode 333 of rectifier device 332 is connected directly to the control electrode 350 of an electron discharge device 351 whose anode 352 is connected directly to the positive terminal of source 322, and whose cathode 353 is connected directly to the cathode 354 of video amplifier discharge device 306, both cathodes being connected through a resistance 355 to ground. Consequently, when there is no tone frequency present on the conductors 151, control electrode 350 of discharge device 351 remains near ground potential so that relatively large current flows through device 351 and maintains its cathode 353 and hence cathode 354 of video amplifier device 306 at a substantial positive potential, so that device 306 cannot amplify. Conversely, when a tone frequency appears on conductors 151, and is rectified by rectifier 332 to make anode 333 assume a substantial negative potential with respect to ground, current flow is cut off in the discharge device 351 so that the cathode 354 of video amplifier 306 falls in potential sufficiently that device 306 amplifies video signals from conductor 133 and impresses them in inverted phase on conductor 139.

The anodes 314 of the device 313 and 315 of device 306 are both connected together and in common through a suitable load resistance 360 to the positive terminal of source 322. The control electrode 312 of device 313 is connected through a suitable grid resistance 361 to ground and the control electrode 305 of the device 306 is similarly connected through a grid resistance 362 to ground. The cathode 363 of discharge device 309 is connected to ground through its biasing resistance 364 which may be made sufficiently large that the device 309 has substantially unity gain or amplification, thereby providing a convenient way of making the gain or amplification between conductor 133 and conductor 139 substantially the same regardless of whether video amplifier 306 or 313 is operating. The control electrode 308 of the device 309 is connected through a suitable grid resistance 365 to ground and the anode 310 is connected through a suitable load resistance 366 to the positive terminal of source 322.

With the described connections, when there is no tone frequency signal present on the conductors 151, video signals on conductor 133 are amplified through discharge devices 309 and 313 and appear on conductor 139 labeled "video out." When there is a tone frequency signal present on conductors 151, the video amplifier discharge device 306 is made operative with the result that video signals on conductor 133 are amplified through device 306 and appear in inverted phase on conductor 139. As a consequence, because the tone frequency signal produced at the transmitter shown in Figure 4 is transferred to the receiver at all times during phase inversion of the video signal and not during times when the video signal is not inverted in phase, the circuit arrangement of Figure 7, which is responsive to that tone frequency signal, reinverts the video signal in the receiver at the proper random time, so that the video signal appearing on the conductor 139 is always in proper phase for the reproduction of the original picture.

To summarize the embodiment of the invention as illustrated in Figures 4–7: At the transmitter, portions of unit 112 act as a generator under control of the scanning system to develop a control signal on the leads 114 having a time characteristic different from that of the synchronizing signals developed in generator 102. The phase inverter 105 responds to this control signal to alter a characteristic, specifically by a phase reversal, of the video portion of the radiated program signal during spaced operating intervals. The tone generator portion of unit 112 develops a key signal indicating the occurrence of the spaced intervals for transmission to subscriber receivers over a line circuit. At the receiver, the phase inverter 138 acts as a decoding device responsive to an applied signal to shift from one operating condition to another to produce a compensating alteration in the received program signal. The filter 154 constitutes a means for applying the received key signal to the decoding device so that this compensating alteration occurs in synchronism with the alterations in the received video signal.

Our invention is characterized by the transmission over the air of a signal which is to be keyed with a signal transmitted by wire to permit the reproduction of a complete usable signal at the receiver. The signal transmitted by air is referred to in the claims as a "program signal." This signal, as explained herein, may consist of a video signal of the type now customarily sent over the air, except that the phase relation of the video signal with respect to blanking pedestals or synchronizing signals is altered recurrently at random times. For example, our first arrangement omits from a standard radiated television signal the vertical and horizontal synchronizing signals which are instead transmitted by wire line and may replace the horizontal synchronizing signal by one which is radiated with false timing. The second arrangement alternately modulates the carrier wave with the video signals so that minimum carrier amplitude during certain intervals represents black while during alternate intervals minimum carrier amplitude represents white.

Other arrangements are also possible; copending application No. 773,848, entitled "Image transmission system" filed September 13, 1947, by Erwin M. Roschke, and assigned to the present assignee, shows a system for recurrently altering the timing relation between the video signal, on the one hand, and the synchronizing signals on the other hand, the blanking pedestals being transmitted in fixed time relation either with the video signals or with the synchronizing signals. Also, copending application No. 30,067, entitled "Television picture reversal," filed April 29, 1948, by Pierce E. Reeves, and assigned to the present assignee, shows a system in which the sweep sequence of each frame is changed at random intervals, so that the picture in a normal receiver appears right-side-up and then upside-down, or reversed horizontally.

Other types of signals could be transmitted by air with suitable corresponding signals transmitted by wire to permit coordination of the signals at the receiver for the reception of a desired signal. We have broadly described the signal transmitted over the air, which in every case is something less than, more than, or different from a normal signal as now transmitted over the air as the program signal to distinguish it from a signal such as is now transmitted over the air for audio or video reception.

We have used the term "key signal" in the claims to define the signal which is transmitted by wire in our various systems.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A subscription type of television system comprising: a picture converting unit; a scanning unit for controlling said converting unit to develop during recurrent trace intervals a video frequency signal representing a scanned subject and including a synchronizing signal generator for developing during interposed intervals a synchronizing signal representing a timing characteristic of said converting unit; a second generator controlled by said scanning unit for developing a further signal having a time characteristic different from said synchronizing signal; means, including a mixer amplifier coupled to said picture converting unit and to said scanning unit, for developing a composite program signal comprising in alternation a video frequency signal and a synchronizing signal at least one of which, during time intervals determined by said further signal, represents an effective abnormal operation of one of said units; means for radiating a subscriber program signal to said receiver; means including a line circuit coupled to one of said generators and extending to said receiver for supplying thereto a key signal which conveys operating information representing the operating condition of said one unit at least during said time intervals; and a picture reconstituting device and an associated scanning system included in said subscriber receiver and responsive conjointly to said composite signal and to said key signal for tracing an image of said scanned subject.

2. In a subscription type of television system, a transmitter comprising: a picture converting unit; a scanning unit for controlling said converting unit to develop during recurrent trace intervals a video frequency signal representing a scanned subject and including a synchronizing signal generator for developing during interposed retrace intervals a synchronizing signal representing a timing characteristic of said converting unit; a second generator controlled by said scanning unit for developing a further signal having a random time characteristic; means, including a mixer amplifier coupled to said picture converting unit and to said scanning unit, for developing a composite program signal comprising in alternation a video frequency signal and a synchronizing signal at least one of which, during time intervals determined by said further signal, has a characteristic altered to represent an effective abnormal operation of one of said units; means for radiating said program signal to a subscriber receiver; means including a line circuit coupled to one of said generators and extending to said receiver for supplying thereto a key signal which conveys operating information representing the operating condition of said one unit, at least during said time intervals; and a picture reconstituting device and an associated scanning system included in said subscriber receiver and responsive conjointly to said composite signal and to said key signal for tracing an image of said scanned subject; and a switch in said line circuit intermediate said transmitter and receiver.

3. A subscription type of television system comprising: a picture converting device; a scanning system for controlling said device to develop during recurrent trace intervals a video frequency signal representing a scanned subject and including a synchronizing signal generator for developing during interposed intervals a synchronizing signal representing a timing characteristic of said device; a second generator controlled by said scanning system for developing a false synchronizing signal having a time characteristic different from said first named synchronizing signal; means, including a mixer amplifier coupled to said picture converting device and to said second generator, for developing a composite program signal comprising in alternation a video frequency signal and the false synchronizing signal; means for radiating said program signal to a subscriber receiver; means including a line circuit extending from said synchronizing signal generator to said receiver for supplying thereto a key signal which conveys information representing the actual timing characteristic of said picture converting device; and a picture reconstituting device and an associated scanning system included in said subscriber receiver and responsive conjointly to said composite signal and to said key signal for tracing an image of said scanned subject.

4. In a subscription type television system; a transmitter comprising a picture converting device; a scanning system for controlling said device to develop during recurrent trace intervals a video frequency signal representing a scanned subject and including a synchronizing signal generator for developing during interposed retrace intervals a true synchronizing signal representing a timing characteristic of said device; a second generator controlled by said scanning system for developing a false synchronizing signal having a timing characteristic different from said first named synchronizing signal; a sound translating device for developing a sound frequency signal from the sound associated with the scanned subject; a mixer coupled to said converting device and to said second generator for developing a wide frequency band program signal including in alternation said video frequency signal and said false synchronizing signal; means for radiating said program signal to a subscriber receiver; a line circuit extending from said transmitter to said receiver; means at said transmitter for modulating said true synchronizing signal in accordance with said sound frequency signal and for transmitting said modulated synchronizing signal over said line circuit at a carrier frequency outside the normal frequency band of speech; an image reproducing device and an associated scanning system included in said subscriber receiver; means included in said receiver for impressing said program signal on said image reproducing device; means for impressing said modulated synchronizing signal on the scanning system of said reproducing device; apparatus for detecting the sound frequency signal of said modulated synchronizing signal; and a sound translating device for reproducing the detected sound frequency signal.

5. In a subscription type television system; a transmitter comprising a picture converting device; a scanning system for controlling said device to develop during recurrent trace intervals a video frequency signal representing a scanned subject and including a synchronizing signal generator for developing during interposed retrace intervals a synchronizing signal representing a timing characteristic of said device; a second generator controlled by said scanning system for developing a control signal having a time characteristic different from said synchronizing signal; means, including a mixer amplifier coupled to said converting device and to said scanning system, for developing a composite program signal including in alternation a video frequency signal and a synchronizing signal; means responsive to said control signal for selectively altering a characteristic of said composite program signal during spaced operating intervals individually starting within a retrace interval of said scanning system; means for radiating said program signal to a subscriber receiver; means including a line circuit coupled to said second generator and extending to said receiver for supplying thereto a key signal which represents the operating intervals in which said characteristic of said program signal is altered; and a picture reconstituting device and an associated scanning system included in said subscriber receiver and responsive conjointly to said composite signal and to said key signal for tracing an image of said scanned subject.

6. In a subscription type television system; a transmitter comprising a picture converting device: a scanning system for controlling said device to develop during recurrent trace intervals a video frequency signal representing a scanned subject and including a synchronizing signal generator for developing during interposed retrace intervals a synchronizing signal representing a timing characteristic of said device; a second generator controlled by said scanning system for developing a control signal having a random time characteristic; means including a mixer amplifier coupled to said converting device and to said scanning system, for developing a composite program signal including in alternation a video frequency signal and a synchronizing signal: means actuated by said control signal solely during retrace intervals for inverting the phase of the video frequency portion of said program signal for spaced time intervals; means for radiating said program signal to a subscriber receiver; means including a line circuit coupled to said second generator and extending to said receiver for supplying thereto a key signal which represents the time intervals in which the phase of said video portion of said program signal is inverted; and a picture reconstituting device and an associated scanning system included in said subscriber receiver and responsive conjointly to said composite signal and to said key signal for tracing an image of said scanned subject.

7. In a subscription type television system; a transmitter comprising a picture converting device; a scanning system for controlling said device to develop during recurrent trace intervals a video frequency signal representing a scanned subject and including a synchronizing signal generator for developing during interposed retrace intervals a synchronizing signal representing a timing characteristic of said device; a second generator controlled by said scanning system for developing a control signal having a random time characteristic; means, including a mixer amplifier coupled to said converting device and to said scanning system, for developing a composite program signal including in alternation a video frequency signal and a synchronizing signal; means actuated by said control signal at random retrace intervals for altering a characteristic of at least a portion of said composite program signal; means coupled to said second generator for producing a key signal indicating the times of alteration of said program signal; means for radiating said program signal to a subscriber receiver; a line circuit coupled to said key signal producing means and extending to said receiver for supplying thereto said key signal; and a picture reconstituting device and an associated scanning system included in said subscriber receiver and responsive conjointly to said composite signal and to said key signal for tracing an image of the scanned subject.

8. A transmitter for subscription type television signals comprising a picture converting unit; a scanning unit for controlling said converting unit to develop during recurrent trace intervals a video frequency signal representing a scanned subject and including a synchronizing signal generator for developing during interposed intervals a synchronizing signal representing a timing characteristic of said converting unit; a second generator controlled by said scanning unit for developing a further signal having a time characteristic different from said synchronizing signal; means including a mixer amplifier coupled to said picture converting unit and to said scanning unit for developing a composite program signal comprising in alternation a video frequency signal and a synchronizing signal at least one of which, during time intervals determined by said further signal, represents an effective abnormal operation of one of said units; means for transmitting said composite program signal over one channel to a point remote from said transmitter; key signal producing means for developing a key signal which conveys information representing the operating condition of said one unit at least during said time intervals; and means for transmitting said key signal to said remote point over another channel.

9. A transmitter for subscription type television signals comprising a picture converting unit; a scanning unit for controlling said converting unit to develop during recurrent trace intervals a video frequency signal representing a scanned subject and including a synchronizing signal generator for developing during interposed retrace intervals a synchronizing signal representing a timing characteristic of said converting unit; a second generator controlled by said scanning unit for developing a control signal having a time characteristic different from said synchronizing signal; means, including a mixer amplifier coupled to said picture converting unit and to said scanning unit, for developing a composite program signal comprising in alternation a video frequency signal and a synchronizing signal; means actuated by said control signal during retrace intervals of said scanning unit for modifying for spaced time intervals a characteristic of said program signal to represent an effective abnormal operation of one of said units; means for radiating said composite program signal over one channel to a point remote from said transmitter; key signal producing means for developing a key signal which represents the time intervals in which said characteristic of said program signal is modified; and means for transmitting said key signal over another channel to said remote point.

10. A transmitter for subscription type television signals comprising: a picture converting device; a periodic scanning system, having a trace interval and a retrace interval in each scanning cycle, coupled to said picture-converting device for controlling said device to develop during each trace interval of a succession of said scanning cycles a video frequency signal representing a scanned subject; a synchronizing signal generator included in said scanning system for developing only during each retrace interval of said scanning cycles a true synchronizing signal representing the timing sequence of said scanning cycles; a second generator coupled to and controlled by said synchronizing signal generator for developing a false synchronizing signal representing a scanning cycle timing sequence substantially different from that represented by said first named synchronizing signal; means, including a mixer amplifier coupled to said picture converting device and to said second generator, for developing a composite program signal comprising in alternation a video frequency signal and said false synchronizing signal; means for radiating said composite program signal over one channel to a point remote from said transmitter; and means coupled to said first mentioned synchronizing signal generator for transmitting said first-named synchronizing signal over a second channel to said remote point.

11. A transmitter for subscription type television signals comprising: a picture converting device; a periodic scanning system, having a trace interval and a retrace interval in each scanning cycle, coupled to said picture converting device for controlling said device to develop during each trace interval of a succession of said scanning cycles a video frequency signal representing a scanned subject; a synchronizing signal generator included in said scanning system for developing during each retrace interval of said scanning cycles a true synchronizing signal representing the timing a second generator coupled to and controlled by said synchronizing signal generator for developing a false synchronizing signal representing a scanning cycle timing sequence substantially different from that represented by said first-named synchronizing signal sequence of said scanning cycles; a sound translating device for developing a sound frequency signal from the sound associated with the scanned subject; means coupled to said picture converting device and to said second generator for developing a wide frequency band program signal including in alternation said video frequency signal and said false synchronizing signal; means for radiating said program signal to a point remote from said transmitter; means included in said synchronizing-signal generator for producing a carrier-wave signal having a frequency corresponding to the repetition frequency of said true synchronizing signal; means for modulating said carrier wave signal in accordance with said sound frequency signal; and means including a line circuit for transmitting said modulated carrier wave signal to said remote point.

12. A transmitter for subscription type television signals comprising: a picture converting device; a scanning system for controlling said device to develop during recurrent trace intervals a video frequency signal representing a scanned subject and including a synchronizing signal generator for developing during interposed intervals a synchronizing signal representing a timing characteristic of said device; a second generator controlled by said scanning system for developing a control signal having a time characteristic different from said synchronizing signal; means, including a mixer amplifier coupled to said picture converting device and to said scanning system, for developing a composite program signal including in alternation a video frequency signal and a synchronizing signal; means responsive to said control signal for altering for spaced time intervals a characteristic of at least a portion of said composite program signal; means for radiating said composite program signal to a point remote from said transmitter; and means including a line circuit coupled to said second generator for transmitting to said remote point a key signal indicating the times of alteration of said program signal.

13. A transmitter for subscription type television signals comprising: a picture converting device; a scanning system for controlling said device to develop during recurrent trace intervals a video frequency signal representing a scanned subject and including a synchronizing signal generator for developing during interposed retrace intervals a synchronizing signal representing a timing characteristic of said device; a second generator controlled by said scanning system for developing a control signal; means, including a mixer amplifier coupled to said picture converting device and to said scanning system, for developing a composite program signal including in alternation a video frequency signal and a synchronizing signal; means responsive to said control signal for inverting the phase of the video frequency portion of said composite program signal for spaced time intervals: means for radiating said composite program signal to a point remote from said transmitter; means coupled to one of said generators for producing a key signal indicating the times of phase inversion of said video frequency portion, and means including a line circuit for transmitting said key signal to said remote point.

14. A transmitter for subscription type television signals comprising: a picture converting device; a scanning system for controlling said device to develop during recurrent trace intervals a video frequency signal representing a scanned subject and including a synchronizing signal generator for developing during interposed retrace intervals a synchronizing signal representing a timing characteristic of said device; a second generator controlled by said scanning system for developing a control signal having a random time characteristic; means, including a mixer amplifier coupled to said picture converting device and to said scanning system, for developing a composite program signal including in alternation a video frequency signal and a synchronizing signal: means actuated by said control signal at random retrace intervals of said scanning system for inverting the phase of the video frequency portion of said composite program signal for spaced time intervals; means for radiating said composite program signal to a point remote from said transmitter; means coupled to said second generator for producing a key signal indicating the times of phase inversion of said video frequency portion; and means including a line circuit for transmitting said key signal to said remote point.

15. A subscription type of television receiver for conjointly utilizing a wide frequency band television signal, received over one channel, including video components occurring during a series of trace intervals and interposed false or incorrectly timed synchronizing components and for conjointly utilizing an audio modulated periodic synchronizing signal accurately representing the time sequence of said trace intervals and received over a line circuit; said receiver including an image reproducing device; a periodic scanning system associated with said device for effecting a scanning function therein at a frequency determined by an applied periodic synchronizing signal; apparatus for impressing said television signal on said image reproducing device; apparatus coupled to said line circuit for impressing said modulated synchronizing signal on said scanning system to effect cyclic scanning in said reproducing device in synchronism with said trace intervals of said television signal to trace an image; a sound translating device; and detector means coupled to said line circuit for demodulating said modulated synchronizing signal to recover the sound frequency signal from said modulated synchronizing signal; and means for impressing said sound frequency signal on said translating device.

16. A subscription type of television receiver for conjointly utilizing a composite television signal and a key signal, said television signal being received over one channel and including in alternation a video frequency signal and a synchronizing signal at least one of which has a characteristic altered from one state to another at spaced time intervals and said key signal being received over another channel and indicating the times of such alterations of said television signal; said receiver including: an image reproducing unit and an associated scanning unit incapable of synthesizing true images under the influence of said television signal in view of said alterations thereof; means for supplying said composite television signal to said reproducing unit and to its scanning unit; decoding apparatus coupled to at least one of said units and responsive to an applied signal to shift from one operating condition to another operating condition for effectively producing a compensating alteration of said characteristic of the received composite signal; and means for applying said key signal to said decoding apparatus so that said compensating alteration occurs in synchronism with the alterations of said received composite signal, thereby to cause said reproducing device to trace the image represented by said video frequency signal.

17. A subscription type of television receiver for conjointly utilizing a composite television signal and a key signal, said television signal being received over a wireless channel and including a video frequency signal having a characteristic altered from one state to another at spaced time intervals and said key signal being received over a line circuit and indicating the times of such alterations; said receiver including; an image reproducing device and an associated scanning system incapable of synthesizing true images under the influence of said television signal in view of the alterations thereof; means for supplying said composite television signal to said reproducing device and to its scanning system; decoding apparatus coupled to said reproducing device and responsive to an applied signal to shift from one operating condition to another operating condition for effectively producing a compensating alteration of said video signal; and means for applying said key signal to said decoding apparatus so that said compensating alteration occurs in synchronism with the alterations of said video signal thereby to cause said reproducing device to trace the image represented by said video frequency signal.

18. A subscription type of television receiver for conjointly utilizing a composite television signal and a key signal, said composite signal being received over a wireless channel and including a video frequency signal the phase of which is inverted at spaced time intervals and said key signal being received over a line circuit and indicating the times of such phase inversions; said receiver including: an image reproducing device and a scanning system incapable of synthesizing true images under the influence of said television signal in view of the phase inversions thereof; means for supplying said composite television signal to said reproducing device and to its scanning system; phase inverting apparatus connected in circuit with said reproducing device and responsive to an applied signal to shift from one operating condition in which a phase inversion is introduced into signals applied to said reproducing device to another operating condition in which no such inversion is introduced; and means for applying said key signal to said phase inverter so that compensating phase inversions are introduced into said video signal, thereby to cause said reproducing device to trace the image represented by said video frequency signal.

ALEXANDER ELLETT.
GILBERT E. GUSTAFSON.
ALBERT COTSWORTH, III.

REFERENCES CITED

The following references are of record in the file of this patent:

UNITED STATES PATENTS

| Number | Name | Date |
|---|---|---|
| 1,811,102 | Adams | Sept. 10, 1924 |
| 1,688,452 | Demarest | May 19, 1926 |
| 1,688,453 | Demarest | Oct. 23, 1928 |
| 1,754,876 | Clement | Apr. 15, 1930 |
| 1,754,877 | Clement | Apr. 15, 1930 |
| 1,763,909 | Stoller | June 17, 1930 |
| 1,769,608 | Tonimato | July 1, 1930 |
| 1,932,253 | Ives | Oct. 24, 1933 |
| 2,017,883 | Zworykin | Oct. 22, 1935 |
| 2,099,115 | Ives | Nov. 16, 1937 |
| 2,114,500 | Nicolson | Apr. 19, 1938 |
| 2,146,876 | Zworykin | Feb. 14, 1939 |
| 2,165,168 | Hardy | July 4, 1939 |
| 2,236,501 | Goldsmith | Apr. 1, 1941 |
| 2,266,988 | Obrien | Dec. 23, 1941 |
| 2,281,891 | Terry | May 5, 1942 |
| 2,297,461 | Dillenburger | Sept. 29, 1942 |
| 2,308,381 | Mertz | Jan. 12, 1943 |
| 2,310,197 | Hansell | Feb. 2, 1943 |
| 2,314,471 | Wright | Mar. 23, 1943 |
| 2,315,362 | Wise | Mar. 30, 1943 |
| 2,386,087 | Bingley | Oct. 2, 1945 |
| 2,401,384 | Young | June 4, 1946 |
| 2,402,067 | Mathes | June 11, 1946 |
| 2,403,059 | Dillenback | July 2, 1946 |
| 2,405,252 | Goldsmith | Aug. 6, 1946 |
| 2,406,811 | Deloraine | Sept. 3, 1946 |
| 2,406,841 | Levy | Sept. 3, 1946 |
| 2,414,101 | Hogan | Jan. 14, 1947 |
| 2,419,568 | Labin | Apr. 29, 1947 |
| 2,429,787 | Young | Oct. 28, 1947 |
| 2,436,516 | Larson | Feb. 24, 1948 |
| 2,472,774 | Mayle | June 7, 1949 |
| 2,477,625 | Labin | Aug. 2, 1949 |

FOREIGN PATENTS

| Number | Country | Date |
|---|---|---|
| 386,849 | Great Britain | Jan. 25, 1933 |